No. 761,458. PATENTED MAY 31, 1904.
L. C. DOWDEN.
CARRIER AND RIDDLE ATTACHMENT FOR POTATO HARVESTERS.
APPLICATION FILED DEC. 5, 1903.
NO MODEL. 2 SHEETS—SHEET 1.
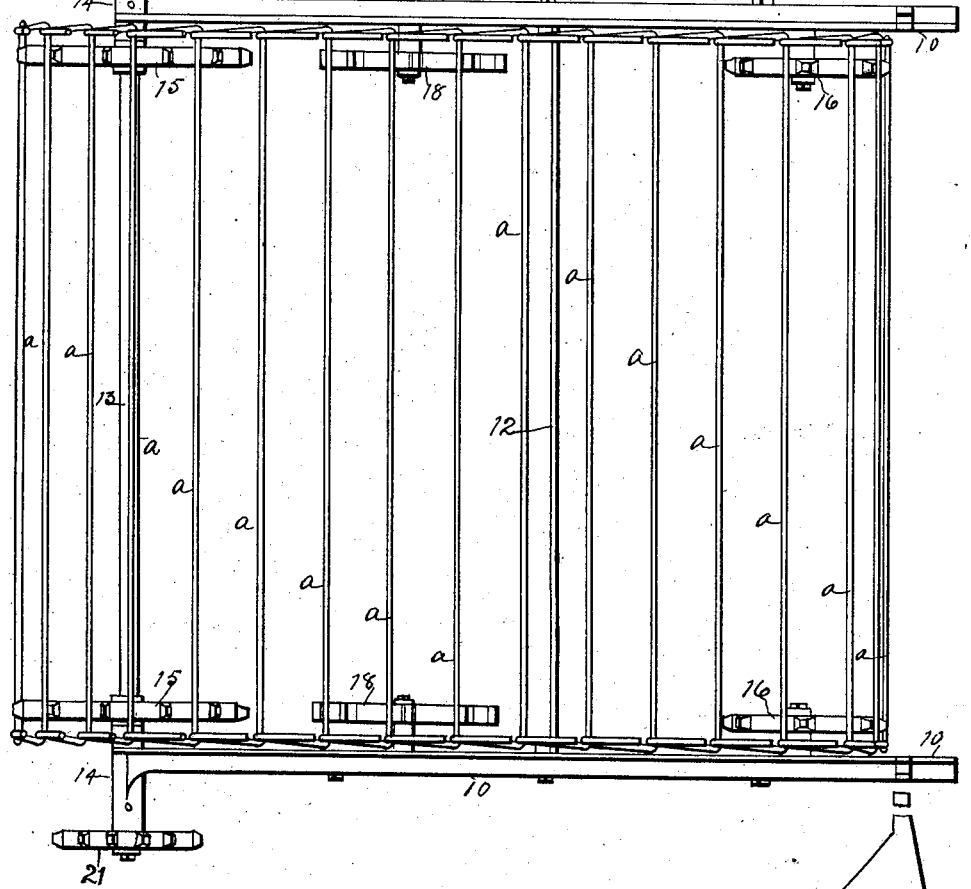
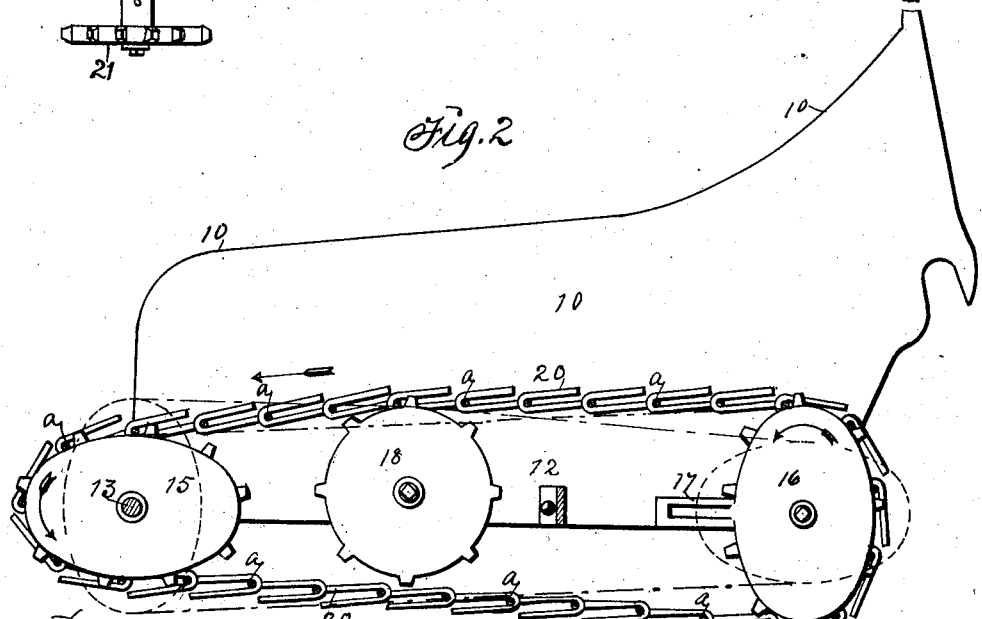

No. 761,458. PATENTED MAY 31, 1904.
L. C. DOWDEN.
CARRIER AND RIDDLE ATTACHMENT FOR POTATO HARVESTERS.
APPLICATION FILED DEC. 5, 1903.
NO MODEL. 2 SHEETS—SHEET 2.
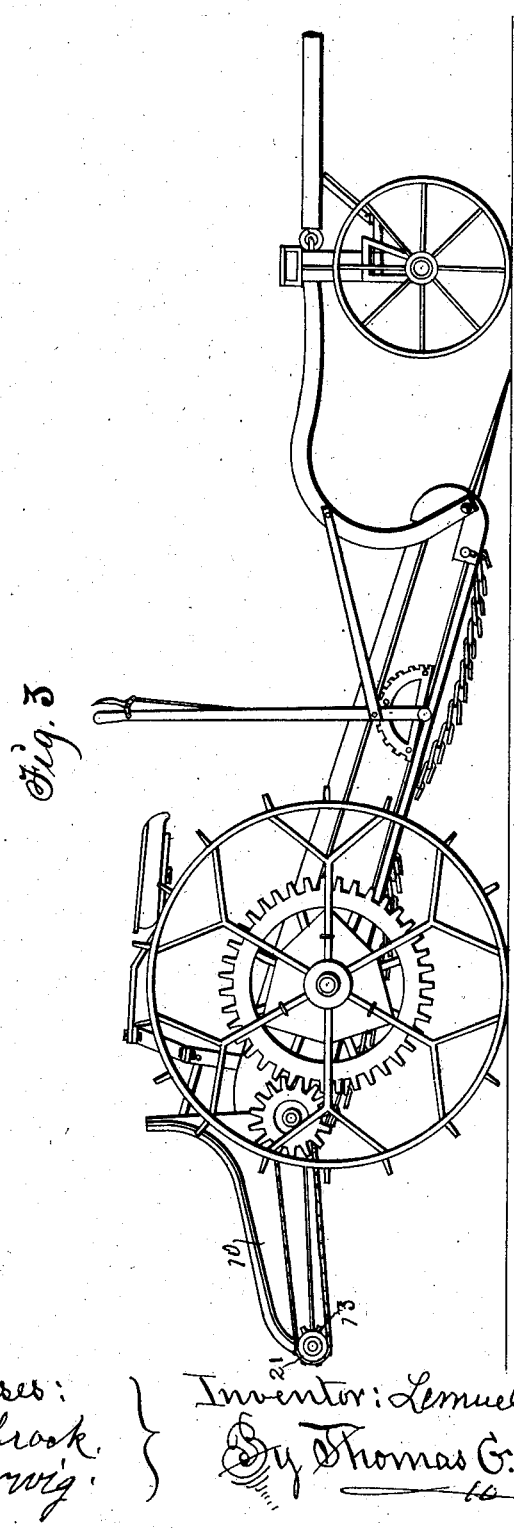

No. 761,458. Patented May 31, 1904.

UNITED STATES PATENT OFFICE.

LEMUEL CYRUS DOWDEN, OF PRAIRIE CITY, IOWA.

CARRIER AND RIDDLE ATTACHMENT FOR POTATO-HARVESTERS.

SPECIFICATION forming part of Letters Patent No. 761,458, dated May 31, 1904.

Application filed December 5, 1903. Serial No. 183,983. (No model.)

*To all whom it may concern:*

Be it known that I, LEMUEL CYRUS DOWDEN, a citizen of the United States, residing at Prairie City, in the county of Jasper and State of Iowa, have invented a new and useful Carrier and Riddle Attachment for Potato-Harvesters, of which the following is a specification.

My object is to provide means for operating an endless auxiliary carrier at the rear end of a potato-harvester in such a manner that the endless carrier will be intermittently raised and lowered and jarred as required to serve as a riddle for shaking ground from the potatoes at the same time they are carried rearward to be discharged at the rear of the machine.

My invention consists in the arrangement and combination of elliptic sprocket-wheels and circular sprocket-wheels with a frame and an endless carrier, as hereinafter set forth, pointed out in my claim, and illustrated in the accompanying drawings, in which—

Figure 1 is a top view of the frame and the endless carrier and means for operating it. Fig. 2 is a side view that shows one side of the frame removed and the positions of the sprocket-wheels relative to each other and the chain, and dotted lines indicate the change of positions of the sprockets and chain when in operation. Fig. 3 is a side view of a potato-harvester and shows my invention applied as required for practical use.

The numerals 10 designate the mating sides of the frame rigidly connected by a cross-bar 12 at the central portions of their lower edges, a rotatable shaft 13 in bearings 14 at the front of their lower edges.

Elliptic sprocket-wheels 15 are fixed to the shaft 13 inside of the sides 10 of the frame, and corresponding elliptic sprocket-wheels 16 are in adjustable bearings 17, attached to the rear ends of the sides 10 and in the same horizontal plane of the shaft 13, but in a right-angled position relative to the sprockets 15 on the shaft 13.

Circular sprocket-wheels 18 in bearings 19, fixed to the sides 10 of the frame, are located between the sprockets 15 and 16 and in an elevated position, as shown in Fig. 2 and as required, to be engaged at their tops only by the endless carrier 20, mounted upon the sprockets.

The carrier is composed of rods *a*, bent at their ends and linked together.

A sprocket-wheel 21 is fixed on the end of shaft 13 to be rotated, by means of a chain and gearing, in a common way.

In the practical operation of my invention when the shaft 13 is rotated the sprockets 15, fixed thereto, will actuate the endless carrier 20, as required, to convey potatoes and ground rearward from a plow in front of the carrier, and the carrier will be alternately raised and lowered at each end by the elliptic sprockets at the ends of the carrier, as required, to shake the carrier and the ground thereon in the manner of a riddle to facilitate separating the ground from the potatoes, and at the same time the endless carrier while in motion will be thrown upon the circular sprockets 18 every time either end of the carrier is lowered by the elliptic sprockets, and such intermittent contact of the endless carrier with the circular sprocket will jar the upper portion of the carrier to riddle the ground from the potatoes while being moved rearward on the carrier to drop upon the ground in rear of the harvester.

Having thus described the purpose of my invention and its construction and operation, the practical utility thereof will be obvious to persons familiar with the art to which it appertains.

What I claim as new, and desire to secure by Letters Patent, is—

An auxiliary endless carrier and riddle for potato-harvesters comprising a frame adapted to be fixed to the rear end of a carriage in rear of an endless carrier, a rotatable shaft mounted in the front end of the frame and elliptic sprocket-wheels fixed on the end portions thereof, elliptic sprocket-wheels in bearings adjustably fixed to the rear end of the frame and their widest diameters in right-angled position to the widest diameters of the elliptic sprocket-wheels on the shaft at the front end of the frame for alternately lifting the ends of an endless carrier, circular sprocket-wheels at the central portion of the
5 frame and their axles in a plane above the axles of the elliptic sprocket-wheels and an endless carrier on the elliptic sprocket-wheels, arranged and combined to operate in the manner set forth for the purposes stated.

LEMUEL CYRUS DOWDEN.

Witnesses:
 A. A. ARNOLD,
 N. D. RIDDLE.